(12) United States Patent
Aigner

(10) Patent No.: US 6,644,370 B2
(45) Date of Patent: Nov. 11, 2003

(54) DEVICE FOR ENLARGING A MACHINE TABLE

(76) Inventor: Georg Aigner, Thannenmais, Reisbach D-94419 (DE)

( * ) Notice: Subject to any disclaimer, the term of this patent is extended or adjusted under 35 U.S.C. 154(b) by 0 days.

(21) Appl. No.: 10/205,928

(22) Filed: Jul. 26, 2002

(65) Prior Publication Data

US 2003/0034089 A1 Feb. 20, 2003

(30) Foreign Application Priority Data

Jul. 28, 2001 (DE) .......................... 201 12 509

(51) Int. Cl.$^7$ ................................. B25H 5/00
(52) U.S. Cl. .................... 144/287; 108/65; 108/69; 144/286.5; 248/223.41; 248/225.11; 403/363; 403/292
(58) Field of Search .................. 83/435.1, 477.2, 83/435.27, 468.3, 648; 108/54.1, 65, 69, 90, 157.16, 157.18; 144/1.1, 286.1, 286.5, 287; 248/222.52, 223.41, 225.11, 439, 637, 645, 676, 678; 403/292, 294, 363, 373, 319, 381

(56) References Cited

U.S. PATENT DOCUMENTS

| | | | | |
|---|---|---|---|---|
| 3,695,189 A | * | 10/1972 | Felder, Jr. | 108/65 |
| 4,677,920 A | * | 7/1987 | Eccardt | 108/69 |
| 5,363,893 A | * | 11/1994 | Grochowicz | 144/287 |
| 5,758,374 A | * | 6/1998 | Ronci | 108/65 X |
| 6,189,429 B1 | * | 2/2001 | Liu | 144/287 X |

* cited by examiner

Primary Examiner—W. Donald Bray
(74) Attorney, Agent, or Firm—Cohen, Pontani, Lieberman & Pavane

(57) ABSTRACT

A device for enlarging a machine table of a machine tool has a rectangular table plate having an end face which can be attached to an edge of the machine table via a retaining device. The retaining device includes a supporting strip which can be fixed to the machine table edge and bears against the latter essentially over the entire length of the supporting strip. Two cap screws project from the supporting strip. Two suspension slots are defined on an underside of the table plate. The suspension slots are open at the bottom for receiving the cap screws in a positive-locking engagement.

16 Claims, 3 Drawing Sheets

DEVICE FOR ENLARGING A MACHINE TABLE

BACKGROUND OF THE INVENTION

1. Field of the Invention

The present invention relates to a device for enlarging a machine table of a machine tool including a table plate, in particular a rectangular table plate, which can be attached at an end face on a longitudinal side or a transverse side of the table plate by a retaining means.

2. Description of the Related Art

Devices for enlarging machine tables of machine tools are used to extend machine tables when especially long workpieces are to be machined. Examples of machines in which these devices are used are woodworking machines such as routing machines, circular saws or planing machines. In known machine table extension devices, an end face of a rectangular table plate has a suspension rail which can be coupled to a retaining means which is designed as a fastening rail. The retaining means is fixed at its two ends so as to bear against the machine table edge, whereas it is at a distance from the machine table edge over most of its length so that the suspension rail can be mounted. At the opposite end, the table plate is supported on the floor via a foot which is of telescopic design for vertical adjustment.

SUMMARY OF THE INVENTION

The object of the present invention is to provide a device for enlarging a machine table which is suitable in particular for vertically adjustable machine tables, for example in planing machines, without a supporting foot of the table plate having to be adjusted in the process for adaptation to the varying height of the machine table.

In the case of the device of the generic machine table, the object is achieved by a device including a retaining means that comprises a supporting strip which can be fixed to an edge of the machine table and bears against the machine table edge essentially over the entire length and from which two cap screws project. The device further includes a table plate having two suspension slots for the positive-locking engagement of the cap screws, the suspension slots being arranged on an underside of the table plate and which are open at the bottom.

An essential advantage of this device over the prior art is that the table plate according to the present invention is fastened to the machine table in an overhung manner like a cantilever, thereby obviating the requirement for a supporting foot, which would have to be adjusted during every change in height of the machine table. Since the entire length of the supporting strip bears against the machine table edge and is firmly connected thereto, the supporting strip provides very stable retention of the table plate. If the two suspension slots are put over the cap screws for this purpose, there is no risk whatsoever of deflection of the table plate, which is attached in a load-bearing manner.

The two cap screws may be arranged at a smaller distance from the top edge of the supporting strip than from the bottom edge so that the bending moment about the horizontal produced by the weight of the table plate increases the stability of the fastening of the table plate. This has a positive effect on the accuracy of the plane passing through from the machine table to the table plate.

The supporting strip may be fixed to the machine table edge by stud bolts. The supporting strip may optionally include adjustable regulating pins for supporting the supporting strip on the machine table edge. The adjustable regulating pins are preferably arranged proximate the two longitudinal ends of the supporting strip. Inaccuracies of the machine table edge facing the supporting strip can be compensated for by these regulating pins, so that the table plate is always oriented accurately on a horizontal plane.

Alternatively, the supporting strip may be designed as an integral part of the machine table, wherein the cap screws are inserted directly into the machine table edge.

The heads of the cap screws may have radially oriented holes for receiving a pin-shaped locking and releasing tool. The cap screws can be adjusted and tightened with the pin-shaped locking and releasing tool after the table plate has been suspended for anchoring the table plate in a fixed and rigid manner on the machine table. Furthermore, the cap screws are precisely adjustable so that the table plate can easily be removed and suspended again free of play to create a continuous plane with the machine table.

The table plate is preferably rectangular and has a continuous cavity parallel to and proximate the region of the two longitudinal edges of the table plate. The continuous cavity includes a longitudinal slot open to the outside for connecting screws to pass through. Two table plates parallel to one another may be connected to form a wider unit using connecting screws which pass through the longitudinal slots. It is also possible to fasten angle strips to the table plate via the connecting screws in the longitudinal slots for extending the width of the table plate.

The continuous cavity may be designed for accommodating rectangular flat nuts for engagement with the connecting screws.

Elongated holes may be made in the underside of the table plate which open into the cavity and providing access for a locking and releasing tool to pass through for actuating heads of the connecting screws which have radial oriented holes.

According to a preferred embodiment of the invention, the rectangular table plate is designed in mirror symmetry relative to a vertical plane along its longitudinal center axis. In this way, it is especially simple to connect a plurality of table plates to one another without having to pay attention to precise lateral positions in the process.

It is advisable to produce the table plate from a light-alloy continuous casting with a hollow lattice profile, as a result of which very high bending rigidity is achieved with low weight.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 1:
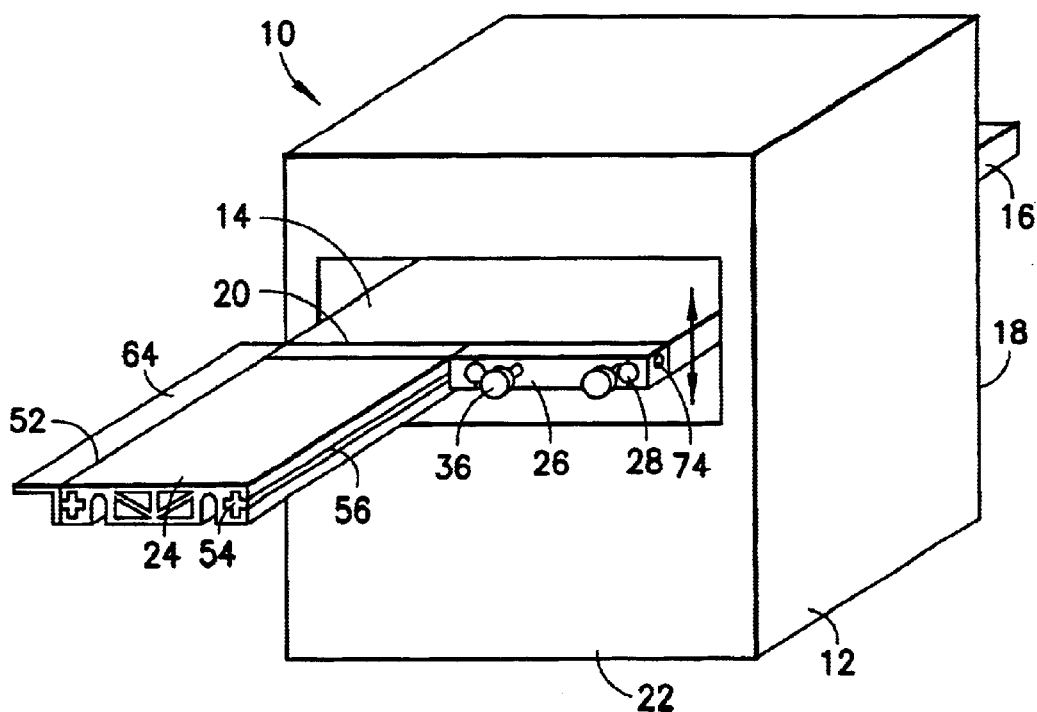
FIG. 1 shows the schematic representation of a machine tool designed as a planing machine and the machine table of which is extended by a device including rectangular table plates and Supporting strips according to the present invention.

FIG. 1 shows the application of the present invention in a planing machine 10, as an example. However, the invention may be implemented in any apparatus comprising a machine table. The planing machine 10 includes a machine table 14 mounted in a vertically adjustable manner in a housing 12. The workpieces to be machined are fed via a delivery table 16 at the front side 18 of the housing 12 into the planing machine 10 and leave the latter in the machined state via the machine table 14 at the rear side 22 of the housing 12.

The example in FIG. 1 shows that either one or two rectangular table plates 24, which serve to extend the machine table 14, may be attached to the transverse edge 20 of the machine table 14.

According to the present invention, a supporting strip 26 is provided for each rectangular table plate 24. The supporting strip 26 is shown in more detail in FIGS. 2 and 3 and is preferably made of steel. Each supporting strip 26 is fastened to the table edge 20 via a stud bolt 28 arranged proximate the two ends if the supporting strip so that the supporting strip 26 runs flush with the machine table 14. The two stud bolts 28 may be threaded or screwed into a tapped hole which is made for this purpose in the table edge 20. Alternatively, the stud bolts 28 may also be fastened via nuts, if space conditions allow this.

Figure 2:
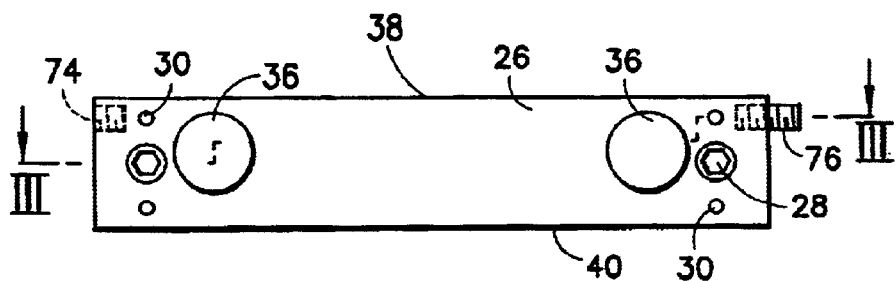
FIG. 2 is a side view showing a side of the supporting strip of FIG. 1 that faces the table plate.
Figure 3:
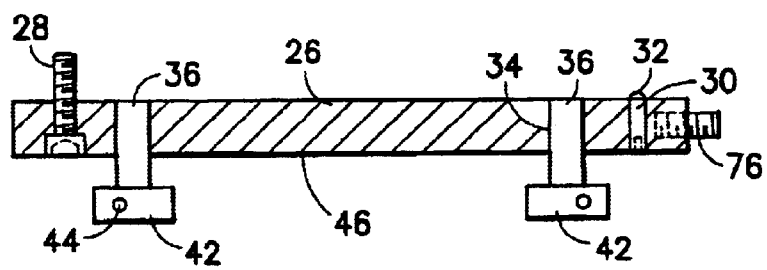
FIG. 3 is a sectional view of the supporting strip in the plane III—III in FIG. 2.

As depicted in FIGS. 2 and 3, regulating pins 30 are screwed into tapped through-holes of the supporting strip 26 both above and below each of the stud bolts 28. The regulating pins 30 may be turned from outside, so that their ends 32 are supported on the table edge 20. The regulating pins 30 provide a means to compensate for unevenness of the table edge 20 facing the Supporting strip 26.

A further tapped hole 34 is likewise made in the supporting strip 26 proximate the two ends of the latter for receiving a cap screw 36, which is screwed or threaded into this tapped hole 34. FIG. 2 shows that the cap screws 36 are at a smaller distance from the top edge 38 of the supporting strip 26 than from the bottom edge 40 of the latter. Radially oriented holes 44 are made in the heads 42 of the cap screws 36 for receiving a pin-shaped locking and releasing tool (see FIG. 3). The pin-shaped locking and releasing tools may be used to adjust the distance of the heads 42 from the opposite vertical surface 46 of the supporting strip 26 (i.e. thread the cap screws 36 into or out/of the tapped holes 34).

Figure 4:
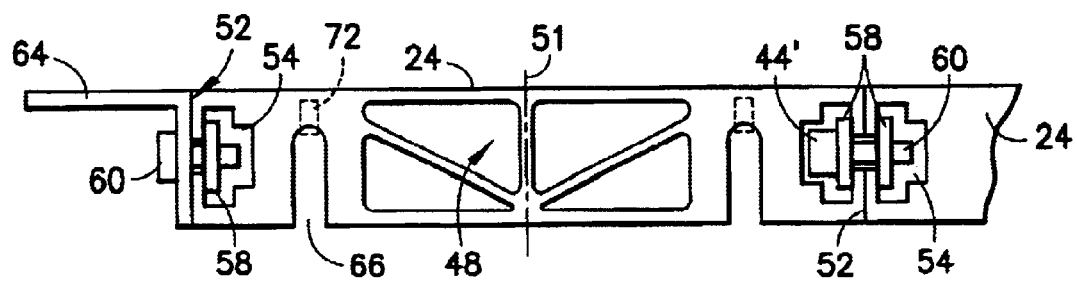
FIG. 4 is an end view of a table plate according to the present invention.
Figure 5:
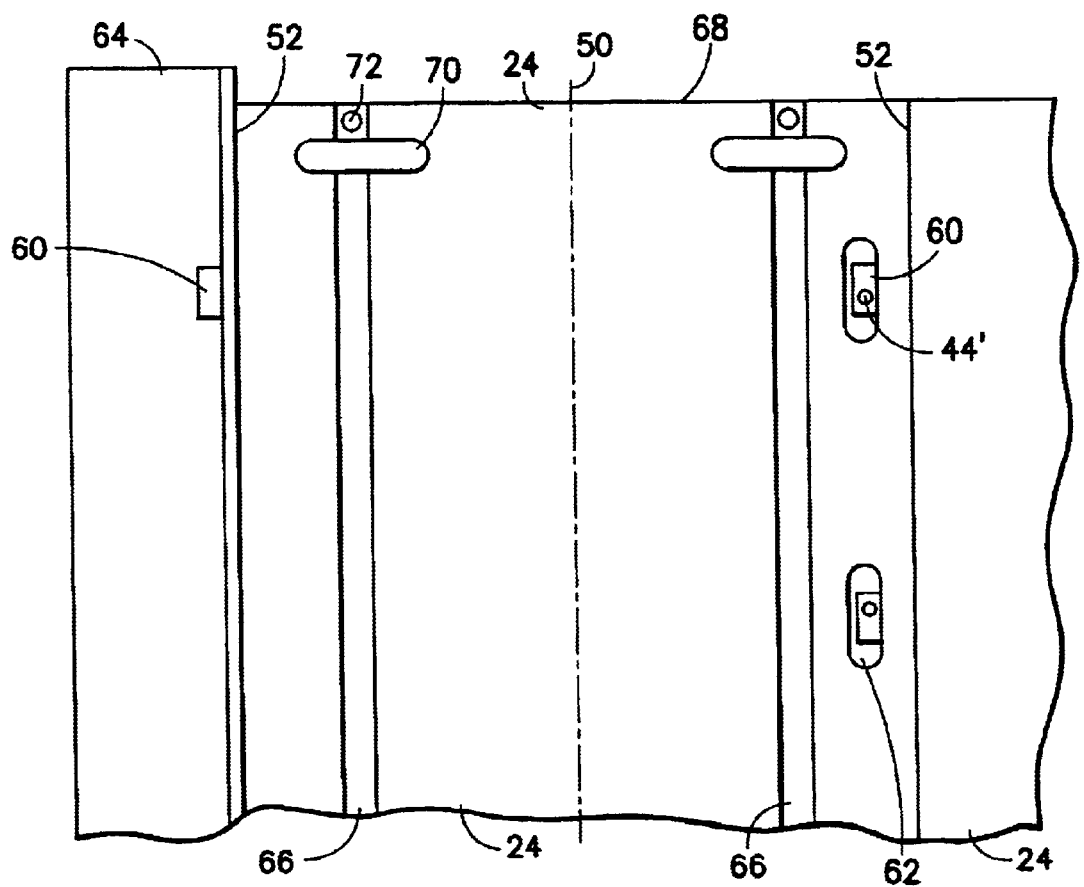
FIG. 5 is plan view of the table plate of FIG. 4.

FIGS. 4 and 5 partially show the end view and bottom view, respectively, of two table plates 24 which are connected to one another and which are produced from a light-alloy continuous casting with a hollow lattice profile 48. In this case, each table plate 24 is designed in mirror symmetry relative to a plane 51 along its longitudinal center axis 50.

The table plates 24 are rectangular and have two longitudinal edges 52. A continuous cavity 54 is arranged proximate each of the two longitudinal edges 52. Each continuous cavity 54 includes a longitudinal slot 56 open to the outside (also shown in FIG. 1). The cavity 54 accommodates rectangular flat nuts 58 (FIG. 4) which are designed for engagement with connecting screws 60. The connecting screws 60 and two flat nuts 58 are used to firmly connect two table plates 24 as FIG. 4 shows, thereby providing a wider unit for the extension of the machine table 14. Like the cap screws 36, the heads of the connecting screws 60 also have radially oriented holes 44' into which a pin-shaped locking and releasing tool may be received. FIG. 5 shows elongated holes 62 arranged through the underside of the table plate 24 which allow the heads of the connecting screws 60 to be actuated from the underside of the table edge 20.

FIGS. 2 and 3 show that in each case a tapped hole 74 for accommodating a headless set screw 76 having a fine thread is made in the two end faces of the supporting strip 26, so that two or more supporting strips 26 may already be firmly connected to one another before being connected to the machine table 14.

FIGS. 1, 4 and 5 show that an angle strip 64 may be attached to the free longitudinal edge 52 of the table plate 24 to widen the table plate 24. Here, too, connecting screws 60 having flat nuts 58 which are inserted into the corresponding cavity 54 are used for fastening the angle strip 64 to the table plate 24.

FIG. 5 shows two longitudinal grooves 66 formed in the underside of each table plate 24. The longitudinal grooves 66 are at the same distance from the longitudinal center axis 50. A suspension slot 70 open at the bottom is made in each longitudinal groove 66 transversely to the latter proximate an end face 68 of the table plate 24 which is to be connected to the supporting strip 26. The width of this suspension slot 70 corresponds to the width of the heads 42 of the cap screws 36. The distance of the suspension slot 70 from the end face 68 corresponds to the distance of the heads 62 of the cap screws 36 from the surface 46 of the supporting strip 22 (see FIG. 3). Finally, the distance between the two longitudinal grooves 66 corresponds to the distance between the two cap screws 36.

The arrangement of the grooves 66, longitudinal slots 70 and cap screws 36 allows the table plate 24 to be mounted on the cap screws 36 in a positive-locking manner. The heads 42 of the cap screws 36 engage the suspension slots 70 while the shanks of the cap screws 36 engage the longitudinal grooves 66, the width of which corresponds to the shank diameter of the cap screws 36. The depth of the longitudinal grooves 66 is dimensioned such that, after the table plate 24 has been mounted, a top side of the table plate 24 lies in the same plane as the top side of the machine table 14.

FIGS. 4 and 5 show that a regulating pin 72 is screwed into a section of each longitudinal groove 66 between the suspension slot 70 and the adjacent end face 68 of the table plate 24. The bottom end of this regulating pin 72 is supported on the shank of the cap screw 36 when the table plate 24 is suspended. Since the regulating screw 72 can be adjusted vertically, the vertical position of the table plate 24 can in this way be set very accurately and flush with the top edge 38 of the supporting strip 26.

The suspension slots 70 extend over a sufficient width allowing a pin-shaped adjusting and releasing tool may be inserted into the holes 44 of the heads 42 in order to tighten the cap screws 36 to firmly and precisely connect the table plate 24 to the machine table 14.

Figure 6:
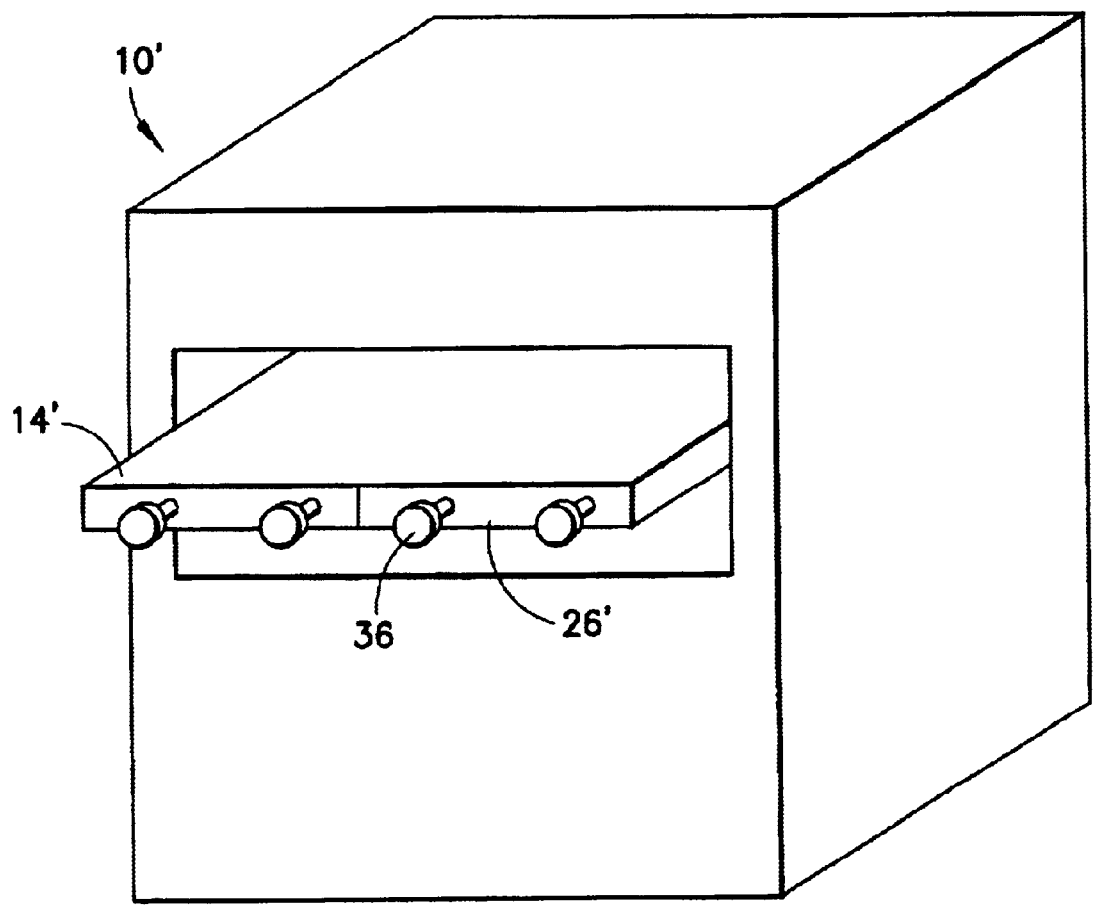
FIG. 6 is a schematic representation of a machine tool having a machine table which includes an integral supporting strip according to another embodiment of the present invention.

As shown in FIG. 6, the supporting strip 26' may be designated as an integral part of a machine table 14'. In this alternative embodiment, cap screws 36' are inserted directly into the machine table edge.

The device according to the invention may not only be used in machine tools but also serves to extend or widen machine tables or work tables in general which are used, for example, for carrying out assembly work. In this case, this form of table top may have a rectangular design or another design, for example trapezoidal. Since the device with table plate and supporting strip forms a modular system, retrofitting on already existing machine tables or work tables is possible without any problems, in which case any desired number of table plates may be combined to produce the desired extension or widening requirements.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for enlarging a machine table, the machine table having a machine table edge, said device comprising:

a retaining device including a supporting strip for connection to the machine table edge such that an entire length of said supporting strip bears against the machine table edge when said supporting strip is connected to the machine table edge, said supporting strip comprising cap screws projecting therefrom; and a table plate having an underside, said table plate defining suspension slots on the underside thereof which open toward a bottom of said table plate for receiving said cap screws therein in a positive-locking engagement for attachment of said table plate to the machine table via said retaining device.

2. The device of claim 1, wherein said supporting strip comprises a top edge and a bottom edge and a distance of said cap screws from said top edge is smaller than a distance of said cap screws from said bottom edge.

3. The device of claim 2, wherein said cap screws comprise a shank having a shank diameter, said table plate further defining two longitudinal grooves in said underside thereof, a distance between said longitudinal grooves corresponding to a distance between said two cap screws, and a width of said longitudinal grooves corresponding to said shank diameter of said cap screw shanks.

4. The device of claim 3, further comprising a vertically adjustable regulating pin threaded into said table plate in a section of each of said longitudinal grooves between said suspension slot and an adjacent end face of said table plate such that said regulating pin is supported on said cap screw shank when said cap screws are received in said suspension slots.

5. The device of claim 1, wherein said cap screws comprise a shank having a shank diameter, said table plate further defining two longitudinal grooves in said underside thereof, a distance between said longitudinal grooves corresponding to a distance between said two cap screws, and a width of said longitudinal grooves corresponding to said shank diameter of said cap screw shanks.

6. The device of claim 5, further comprising a vertically adjustable regulating pin threaded into said table plate in a section of each of said longitudinal grooves between said suspension slot and an adjacent end face of said table plate such that said regulating pin is supported on said cap screw shank when said cap screws are received in said suspension slots.

7. The device of claim 1, wherein said supporting strip comprises stud bolts for connection of said supporting strip to the machine table edge.

8. The device of claim 7, wherein said supporting strip further comprises a pair of adjustable regulating pins proximate each longitudinal end thereof and having ends facing the machine table edge for supporting said supporting strip on the machine table edge when said supporting strip is connected to the machine table.

9. The device of claim 1, wherein said supporting strip includes a tapped hole at each longitudinal end face thereof for connection to a further supporting strip via a headless set screw attached at said tapped hole.

10. The device of claim 1, wherein the supporting strip comprises an integral part of the machine table.

11. The device of claim 1, wherein each of said cap screws comprises a head having radially oriented holes for receiving a pin-shaped locking and releasing tool.

12. The device of claim 1, wherein said table plate is rectangular and comprises two longitudinal edges, said table plate further defining a continuous cavity proximate and parallel each of said two longitudinal edges, said continuous cavity having a longitudinal slot open to the outside of said longitudinal edges for receiving connecting screws therethrough.

13. The device of claim 12, wherein said continuous cavity accommodates rectangular flat nuts for engagement with the connecting screws.

14. The device as claimed in claim 12, wherein said table plate further defines elongated holes in said underside thereof, said elongated holes opening into said continuous cavity and providing access for a locking and releasing tool to pass through for actuation of said connecting screws.

15. The device of claim 12, wherein said table plate comprises a longitudinal center axis and is designed in mirror symmetry relative to a vertical plane intersecting the longitudinal center axis.

16. The device of claim 1, wherein said table plate is produced from a light-alloy continuous casting and comprises a hollow lattice profile.

* * * * *